(12) United States Patent
Petrack et al.

(10) Patent No.: US 8,804,931 B2
(45) Date of Patent: Aug. 12, 2014

(54) PHONE NUMBER VERIFICATION

(75) Inventors: Scott Petrack, Palo Alto, CA (US);
Rahul Malegaonkar, Santa Clara, CA (US)

(73) Assignee: Skype, Dublin (IE)

( * ) Notice: Subject to any disclaimer, the term of this patent is extended or adjusted under 35 U.S.C. 154(b) by 35 days.

(21) Appl. No.: 13/482,587

(22) Filed: May 29, 2012

(65) Prior Publication Data
US 2013/0322612 A1    Dec. 5, 2013

(51) Int. Cl.
*H04M 15/06*    (2006.01)

(52) U.S. Cl.
USPC ............... 379/142.04; 379/86.19; 379/88.23; 379/142.05

(58) Field of Classification Search
USPC .......... 379/142.04, 88.19, 88.2, 88.21, 93.03, 379/120, 207.14, 207.15, 88.23, 142.05
See application file for complete search history.

(56) References Cited

U.S. PATENT DOCUMENTS

| | | | |
|---|---|---|---|
| 7,386,103 B1 | 6/2008 | Chahal | |
| 7,903,635 B2 | 3/2011 | Silver et al. | |
| 8,077,849 B2 * | 12/2011 | Altberg et al. | 379/201.01 |
| 2007/0243857 A1 | 10/2007 | Espejo et al. | |
| 2008/0082515 A1 * | 4/2008 | Gould | 707/4 |
| 2010/0184401 A1 | 7/2010 | Spence | |
| 2011/0294472 A1 * | 12/2011 | Bramwell et al. | 455/413 |

FOREIGN PATENT DOCUMENTS

| | | |
|---|---|---|
| WO | WO-0237240 | 5/2002 |
| WO | WO-2009039866 | 4/2009 |

OTHER PUBLICATIONS

"Planet Convergence Calling Card Services", Retrieved at <<http://planetconvergence.co.uk/sparkle_pstn_calls.php>> Retrieved Date: Apr. 5, 2012, pp. 2.
Pegu, Uttam, "Speaker Recognition for Caller Authentication in IVR", Retrieved at <<http://www.ivrsworld.com/speaker-recognition/speaker-recognition-for-caller-authentication-in-ivr/>> Mar. 5, 2010, pp. 7.
"Interactive Voice Response (IVR)", Retrieved at <<http://www.astecs.com/ivr>> Retrieved Date: Apr. 5, 2012, pp. 2.
"How to Set a Google Voice Number As Your Caller ID on Skype", Retrieved from: <http://www.wikihow.com/Set-a-Google-Voice-Number-As-Your-Called-ID-on-Skype> on Jul. 10, 2013 (May 18, 2010), 1 page.
"PCT Search Report and Written Opinion", Application No. PCT/US2013/041482, (Jul. 24, 2013),13 pages.

* cited by examiner

*Primary Examiner* — Duc Nguyen
*Assistant Examiner* — Yosef K Laekemariam
(74) *Attorney, Agent, or Firm* — Sonia Cooper; Jim Ross; Micky Minhas

(57) ABSTRACT

A method of altering a caller line identification in a phone service is disclosed. The method includes receiving, via a user interface, a phone number from a user of the phone number. A to-be called phone number is then selected from a pool of phone numbers. The to-be called phone number is temporarily associated with the phone service for a selected period of time. The to-be called phone number is displayed on the user interface. Via the user interface, the user is requested to call back the displayed to-be called phone number within the selected period of time.

20 Claims, 2 Drawing Sheets

PHONE NUMBER VERIFICATION

BACKGROUND

When a telephone user makes a phone call, the phone device on the receiving end displays the identity of the calling device. In some cases, the calling user has an option to disable the display of the calling user's identification.

At present, there are many traditional and voice over IP (VoIP) service providers that provide phone services to users and it is not unusual for a user for have multiple phone numbers. For example, a user might get a Skype™ phone number, a Google Voice™ phone number, a mobile phone number, a home phone number and so on. However, the user may not want to publish all his/her numbers to the world. Also, a user may be using some phone services only for calling others and may not wish to receive a call back on the same number. For example, a user may use his Skype number for calling others but would like others to always call the user back to the user's home phone number. This way, others need to remember and store just one number for the calling user. Moreover, if the calling user makes a call from a new phone number with the particular phone number configured as calling line identification (CLI), the receiving phone user will know who is calling before picking up the phone. In order not to publish the number from which the user makes calls, the CLI needs to be changed to a desired phone number.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method of altering a caller line identification in a phone service is disclosed. The method includes receiving, via a user interface, a phone number from a user of the phone number. A to-be called phone number is then selected from a pool of phone numbers. The to-be called phone number is temporarily associated with the phone service for a selected period of time. The to-be called phone number is displayed on the user interface. Via the user interface, the user is requested to call back the displayed to-be called phone number within the selected period of time.

In another embodiment, a method of altering a caller line identification in a phone service is disclosed. The method includes receiving, via a user interface, a phone number from a user of the phone number, outputting a second phone number on the user interface, receiving a phone call from the phone number at the second phone number and verifying that a caller identification of the received call has been verified by a phone network that carried the received phone call.

In yet another embodiment, a method of altering a caller line identification in a phone service is disclosed. The method includes receiving, via a user interface, a phone number from a user of the phone number. A type of one of a plurality of previously entered items of information is then randomly selected and associated with the phone service for a selected period of time. A phone call is then placed to the phone number. The method further includes reciting the selected type of the one of the plurality of previously entered items of information to the user via the phone call and receiving an information related the recited type of one of the plurality of previously entered items of information via the user interface and comparing with the one of a plurality of previously entered items of information.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the described embodiments can be understood in detail, a more particular description, briefly summarized above, may be had by reference to embodiments below, some of which are illustrated in the appended drawings. It is to be noted, however, that the appended drawings illustrate only typical embodiments and are therefore not to be considered limiting of its scope.

DETAILED DESCRIPTION

In the following description, numerous specific details are set forth to provide a more thorough understanding of the various embodiments. However, it will be apparent to one of skill in the art that the various embodiments may be practiced without one or more of these specific details. In other instances, well-known features have not been described in order to avoid obscuring the description.

Reference throughout this disclosure to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In order to allow a user to change the CLI, a service provider must ensure that the number being configured as the CLI is owned or available at the user's disposal. While it may be relatively easier to make such determination by sending a text message to a mobile phone, if the mobile phone is being configured as the CLI, the same process cannot be employed for phone numbers that do not accept text messages. The following description discloses verifying a phone number to be configured as caller line identification and configuring the phone service to have a new caller line identification.

Figure 1:
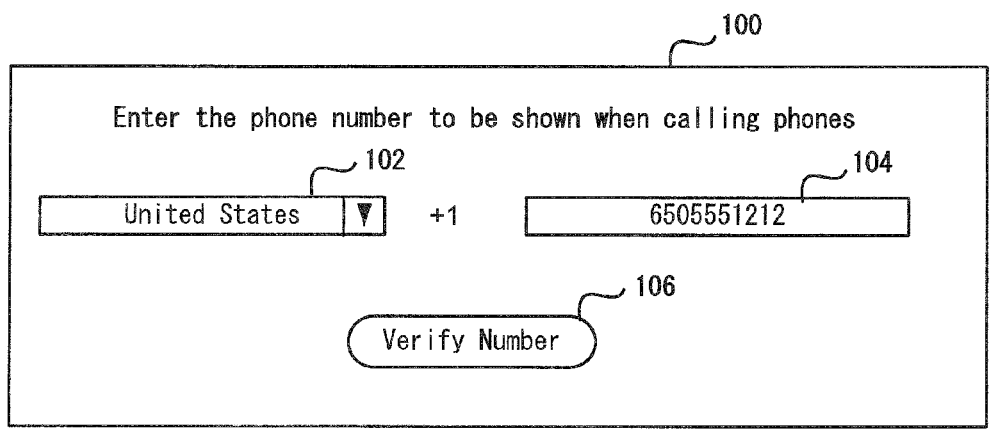
FIGS. 1 and 2 illustrate exemplary user interfaces for configuring the CLI, according to one or more embodiments.

FIG. 1 illustrates an example user interface 100 for changing or adding the CLI to an existing telephone number. In one embodiment, the user interface 100 is a part of a user's account maintenance user interface, which may be password protected (or may be made secure using other well-known user authentication methods). The user then enters in, using UI controls 102, 104, a desired phone number that the user would like to use as the CLI and selects the verify number button 106. A person skilled in the art would recognize that there may be many others ways to enter the desired number as, for example, a different type of user interface design so long as the user is enable to enter a phone number.

Figure 2:
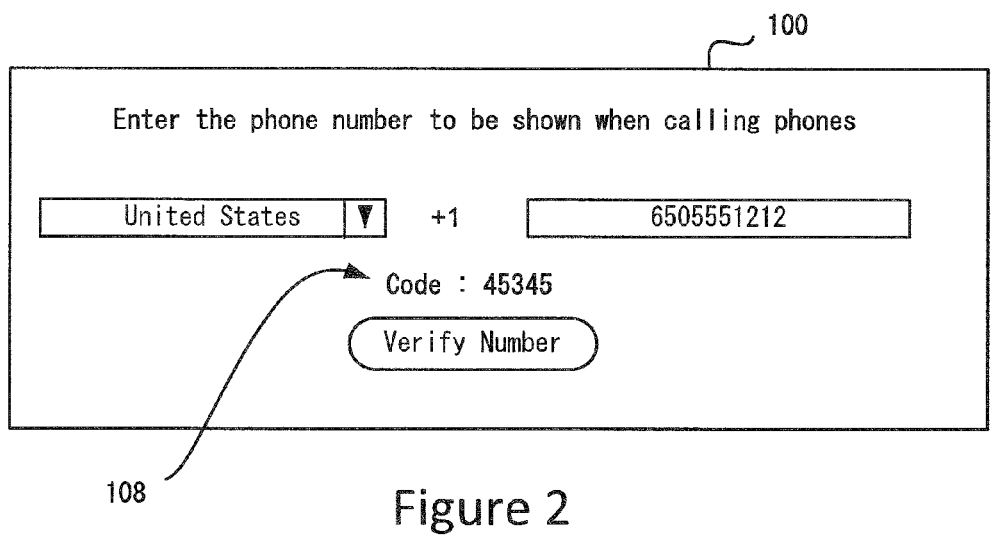

As displayed in FIG. 2, upon entering the desired phone number and selecting the verify number button 106, in one embodiment, a random dial-tone multi frequency signaling (DTMF) code 108 is generated and displayed on the user interface 100. Even though, the generated DTMF code 108 may be configurable to be of any length, in practice, the generated DTMF code may be limited to 4 to 6 characters in length. A longer number would provide better security but would be difficult for the user to remember. Therefore, a fixed length may be configured based on a usability analysis and a degree of security. In another embodiment, the random number may be configured to be of variable length. That is, sometime the generated DTMF number could be three characters long, sometimes five and so on.

After the DTMF number is generated, the generated number is temporarily stored in the user's account. The duration of this temporary storage may be configurable anywhere from a few minutes to a few days.

Figure 3:
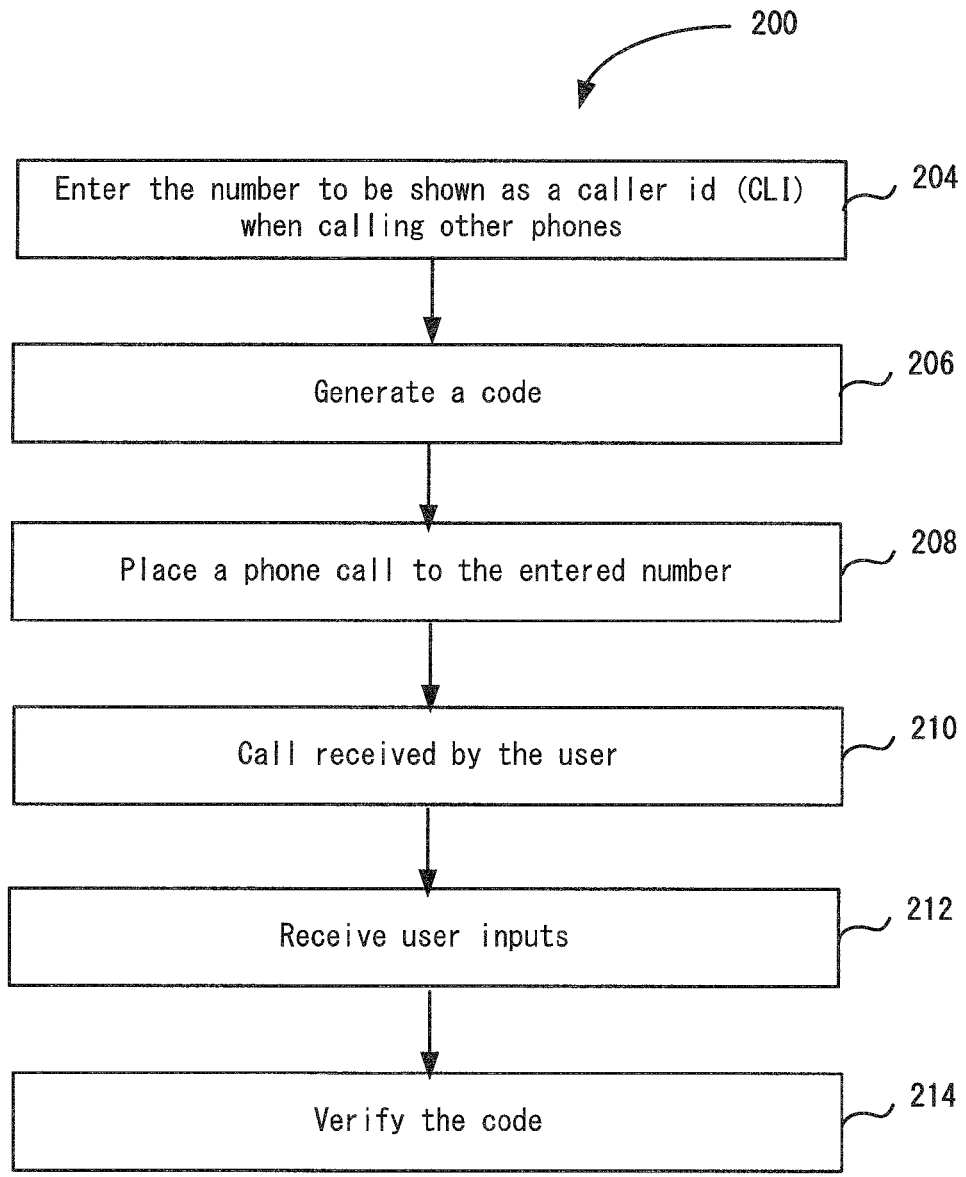
FIG. 3 illustrates a method of configuring the CLI, according to one or more embodiments.

FIG. 3 illustrates a method 200 of configuring the CLI in accordance with one or more embodiments. Accordingly, at step 204, a user enters, in a user interface associated with the user's account maintenance user interface (associated with the user's alternative or second phone number), a desired phone number to be shown as a call identification when other phones are called from the user's phone. The entered phone number could be a land line phone number or a mobile phone number or an online phone number (e.g., Google Voice™ number, etc.) At step 206, the user interface generates a random code, e.g., a DTMF code, and displays the generated code to the user. The code is temporarily stored in the user's account. At step 208, a phone authentication system associated with the user's account in which the CLI is being configured, places a phone call to the entered number. The phone call is placed to verify user's ownership of the entered phone number. At step 210, the user receives the call. During the call, the user is asked to enter the code, e.g., the DTMF code, via a telephone prompt and the entered data is received by the phone authentication system. At step 212, the phone authentication system receives the user inputs. At step 214, the authentication system retrieves the temporarily stored code from the user's account and compares with the user inputs for verification. Upon a successful verification, the entered phone number is permanently stored in the user's account and is used as a caller identification when the user places calls from the user's alternative or second phone.

In another embodiment, instead of generating a random DTMF code and displaying on the user interface 100, after the user enters the desired phone number in the user interface 100, a phone call is placed to the entered number. When user picks up the call placed at the entered phone number, the user hears a recital of a security code. The security code could be a number, group of letters, a word or a combination thereof. The security code may also include special characters that are commonly found on computer keyboards. The recited security code is temporarily stored in the user's account. The duration of the temporary storage may vary from a few minutes to a few hours. Within a predefined time interval after receiving the phone call, the user is required to visit the account maintenance user interface and enters the recited code. If the entered code matches the temporarily stored security code, the entered phone number is considered verified.

In yet another embodiment, instead of reciting a code via a phone call, the user is requested, via the phone call to the entered phone number, to enter a selected previously entered data. For example, a user may have previously setup a security code to access the user's account maintenance user interface. Alternatively, the user may have provided his zip code, birthday, house number, a random information, etc. The phone call randomly picks previously entered information and requests the user to enter the randomly picked information in the user account maintenance user interface. For example, the phone call may recite, "Please enter your zip code in via the account user interface." The call may also specify a time period within which the requested information must be entered. If the requested information is not entered within the specified time, the authentication process is repeated from the beginning. If the user, within a selected period of time, visits the user's account maintenance user interface and enters the zip code (in this example) for the verification of the entered phone number and if the entered zip code matches with the previously stored zip code, the entered phone number is confirmed as the user's caller identification. In another embodiment, instead of selecting a type of information (e.g., zip code) or in the case in which the user has not provided any demographic information (or in addition to), a random type is generated and the user is asked to provide the answer or related information for the randomly generated type of information. For example, the system may ask the user, via a phone call recital, to enter the name of the president of the USA. The randomly generated type of information may be collected from a database includes general knowledge questions. In one embodiment, the selected period of time is between 1 seconds to 10 minutes. In other embodiments, the range may be different and may include a longer duration. In another embodiment, the time period range may be configurable by the user of the phone service.

Upon successful verification of the entered phone number, the entered phone number is stored in the user's phone service profile and used by a telephony subsystem as the caller line identification when the user places outgoing calls using the telephony service in which the caller line identification is configured to show the entered number. In one embodiment, after successful verification, an email or text message is sent to the user to inform the user that the entered phone number has successfully verified.

In yet another embodiment, after the user enters a phone number in the user's phone service profile with a desire to use the entered phone number as the Calling Line Identification (CLI), the user is provided with a phone number to call from the entered phone number (i.e., from the phone line associated with the entered phone number) within a selected time period (in one example, within five minutes from entering the phone number in the user's phone service profile). Upon receiving the phone call, a determination is made whether the caller identification has been verified by the phone network that routed the phone call to the phone authentication system associated with the user's phone service profile ("System"). In one embodiment, the caller identification can be verified using the presentation and screening indicator data that is provided to the System associated with the user's phone service profile by the phone network that carried the phone call. The screening indicator data provides bits to identify whether the caller identification is provided by the phone network or the user. If the caller identification is determined to be provided by the phone network or by the user but the phone network has verified the caller identification, the System then determines whether the phone number in the caller identification was recently added to any user's phone profile. In one embodiment, the term "recently" means within a pre-selected period of time prior to receiving the phone call. The user is informed about this selected period of time when the user enters the phone number in the user's phone service profile. In one embodiment, this time period may be configured to be the same for all users. In another embodiment, the time period is randomly generated (typically in minutes) and temporarily stored in the user's phone service provide when the user enters the phone number in the user's phone service profile.

If it is determined that the caller identification of the phone call is either provided by the phone network or has been verified by the phone network, the System searches for a user profile to which the phone number in the caller identification was added. If a user profile is found, the System then determines if the phone call was placed within the pre-selected time period. When these conditions are met, the System adds the entered phone number in the user's phone service profile and subsequently when the user places any phone calls using the phone service (associated with the user's phone service profile), instead of user's phone service phone number, the System uses the entered phone number as the CLI.

However, if it is determined from the presentation and/or screening indicator data that the caller identification was user-provided and either not screened by the phone network or the verification was failed, the System may informs the caller that the phone number could not be added as the CLI. The System may be configured not to allow using the entered phone number as the CLI if the verification fails.

In another embodiment, if the verification fails per the foregoing method, the System may ask verification questions to ensure to verify the identity of the caller and to ensure that the caller in fact is in fact the same person as the user of the user's phone service profile. If the user successfully enters correct responses to the verification questions (e.g., date of birth, last number called using the phone service associated with the user's phone service profile, and other similar questions that can be derived from the user's use of the phone service associated with the user's phone service profile), the System may be configured to allow adding an unverified phone number as the CLI.

In yet another embodiment, after the user enters a phone number, the System provides a phone number with an extension for the user to call from the entered phone number (e.g., from the phone line associated with the entered phone number). The extension number is generated randomly and temporarily associated with the user's phone service profile, at least for a selected period of time. If a call is received to verify the entered phone number, the extension number dialed by the user is used to locate the user's phone service profile. In this embodiment, the System does not need to search through millions of records to locate the user's phone service profile. Further, the extension number also provides a level of authentication because only the user who entered a phone number in the user's phone service profile would know this extension number.

In another embodiment, as an added verification step, after receiving the phone call from the user to verify the entered phone number, within a selected time interval, the System places a phone call to the entered phone number and informs the receiving that someone just attempted to add the entered phone number as the CLI in the phone service and ask the receiver of the call to confirm by pressing a selected key on the phone device. This step would prevent unauthorized use of the entered phone number if the user come into a temporary physical possession of the phone device associated with the entered phone number (for example, a house guest attempts to add his host's phone number and makes a call from the entered phone number to verify the entered phone number, without any knowledge of the host. But if the System calls back the entered phone number for a further verification, the host is likely to pick up the phone and not the guest).

In yet another embodiment, after the user enters a phone number in step 204, at step 206, the System internally generates a numeric code. At step 208, a phone call is placed by the phone authentication system to the entered phone number. At the time of placing the phone call, the outgoing caller id is spoofed and instead of the phone number of the calling phone line, the internally generated code is shown on the handset associated with the called number. In one embodiment, after the user enters the phone call and prior to placing the call to the entered phone number, the user is informed about such a call with spoofed caller id and the user is required to simply note down the code in the caller id and disregard the call. In one embodiment, the caller id may also include some random prefixes and/or suffixes. The user is informed about the structure of the number in the caller id to enable the user to extract the code to be entered from the number in the caller id.

In another embodiment, instead of caller id spoofing, the System uses one of many phone numbers to place the phone call to the entered number. For example, the System may have a pool of five hundred phone numbers and can pick one of the number from the pool to call the entered number. The user is informed to pick some randomly selected digits from the shown number. For example, the user may be requested to pick the last two or three or four or five digits. In step 206, the System select a phone number from the pool of numbers and randomly picks the last two or last three or last four or last five digits. These randomly picked up digits are stored temporarily in the user's account. The same random picking algorithm is used to provide instructions to the user.

In another embodiment, the System may also request the user to add (or subtract) a randomly picked number to the selected number from the caller id display, as described in the above paragraphs. For example, if the caller is "6502097867" and the user is requested to pick the last four digits "7867," the System may also request the user to add, for example, the number "3" to the above four digit code. This mechanism will be especially useful when the pool of phone numbers, as described above, is small.

In an alternate embodiment, two or more verification methods in the foregoing paragraphs may be combined to verify the entered phone number. Further, selected features of the above verification embodiments may be combined to verify the entered phone number.

While the forgoing is directed to various embodiments, other and further embodiments may be devised without departing from the basic scope thereof. For example, aspects of the described embodiment may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions described herein, are included as embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
altering a caller line identification in a phone service by at least:
receiving, via a user interface, a phone number from a user of the phone number;
selecting a to-be called phone number from a pool of phone numbers and temporarily associating the to-be called phone number with the phone service for a selected period of time; and
displaying the to-be called phone number and a security code on the user interface, wherein via the user interface, the user is requested to call back the displayed to-be called phone number within the selected period of time and input the security code to verify that the to-be called phone number is authorized to be used by the user as an alternate caller line identification with the phone service.

2. The method of claim 1, wherein the phone number is different from the caller line identification associated with the phone service.

3. The method of claim 1, wherein the displayed to-be called phone number includes an extension number, wherein the extension number is automatically generated and temporarily associated with the phone service for the selected period of time.

4. The method of claim 1, further includes:
receiving a phone call from the user using the entered phone number; and
verifying if the phone call was placed to the displayed to-be called phone number.

5. The method of claim 4, wherein the verifying further including determining that the phone call was placed with the selected period of time.

6. The method of claim 3, further includes receiving a phone call from the user at the displayed to-be called number and the extension number.

7. The method of claim 4, further includes configuring the phone number as a caller line identification for the phone service.

8. A method comprising:
altering a caller line identification in a phone service by at least:
receiving, via a user interface, a phone number input by a user of the phone number to designate as an alternate caller line identification with a phone service;
outputting a second phone number on the user interface for the user to call to verify that the input phone number is available to the user for use as the alternate caller line identification;
receiving a phone call from the phone number at the second phone number; and
verifying, based on the received phone call, that a caller identification of the received call has been authorized, by a phone network that carried the received phone call, as being available to the user.

9. The method of claim 8, wherein the verifying includes checking a screen indicator data provided by the phone network to determine whether a caller identification of the received call is provided by the phone network.

10. The method of claim 8, wherein the verifying includes checking a screen indicator data provided by the phone network to determine whether a caller identification of the received call is provided by the user but has been successfully verified by the phone network.

11. The method of claim 8, wherein the verifying includes determining if the received phone call was placed within a selected time after the receiving the phone number.

12. The method of claim 11, wherein the selected time is in a range of 1 second and 10 minutes.

13. The method of claim 8, wherein the verifying includes placing a second phone call back to the received phone number and asking a receiver of the second phone call to confirm a user of the received phone number as a caller line identification.

14. The method of claim 8, wherein the verifying includes configuring the phone number as a caller line identification for the phone service.

15. A method comprising:
altering a caller line identification in a phone service by at least:
receiving, via a user interface, a phone number from a user of the phone number to employ as an alternate caller line identification for phone service;
randomly selecting and displaying security information for subsequent input by a user to verify that the phone number is authorized to be used by the user as the alternate caller line identification with the phone service;
verifying authorization of the phone number to be used by at least:
placing a phone call to the phone number;
requesting input of the security information by the user via the phone call; and
receiving input from the user in response to the requesting and comparing the input with the security information that is selected and displayed.

16. The method of claim 15, wherein the phone number is different from the caller line identification associated with the phone service.

17. The method of claim 15, wherein the security information comprises a randomly generated dial-tone multi frequency (DTMF) code.

18. The method of claim 15, wherein the security information is selected as an item from a group of previously input items associated with an account of the user.

19. The method of claim 15, wherein the selected period of time is in a range of 1 second and 10 minutes.

20. The method of claim 15, further comprising, upon a successful comparison of the input to the security information, configuring the phone number as the caller line identification for the phone service.

* * * * *